United States Patent [19]
Frey et al.

[11] 4,211,389
[45] Jul. 8, 1980

[54] RESILIENT ARTICLE STACK BINDER

[75] Inventors: Lawrence A. Frey; Robert E. Harrison, both of Portland; James E. McGriff, Oregon City, all of Oreg.

[73] Assignee: Timber Conversion, Inc., Portland, Oreg.

[21] Appl. No.: 900,473

[22] Filed: Apr. 27, 1978

[51] Int. Cl.$^2$ .................. B60P 7/12; B61D 45/00; B66D 1/48
[52] U.S. Cl. .................. 24/269; 24/68 CT; 267/71
[58] Field of Search .............. 24/68 CD, 68 CT, 71.2, 24/269; 105/477; 254/78, 79, 52, 164, 165; 267/69, 71; 280/179 A, 179 B, 179 R

[56] References Cited
U.S. PATENT DOCUMENTS

| | | | |
|---|---|---|---|
| 1,260,921 | 3/1918 | Leissner | 267/69 |
| 1,972,346 | 9/1934 | Juline | 254/78 |
| 2,942,867 | 6/1960 | Rumsey | 105/477 |
| 3,279,759 | 10/1966 | Tallman | 254/165 |

*Primary Examiner*—Howard Beltran
*Attorney, Agent, or Firm*—Kolisch, Hartwell & Dickinson

[57] ABSTRACT

Apparatus for binding a load of articles including an elongate cable extending about the load, and a spring-loaded device operatively interconnecting opposite ends of the cable. A cable take-up drum is provided to adjust the effective length of the cable extending about the load and to deflect the spring to provide selected tightening of the cable about the load. Should the load change configuration the spring maintains the cable taut about the load.

3 Claims, 7 Drawing Figures

U.S. Patent    Jul. 8, 1980    4,211,389
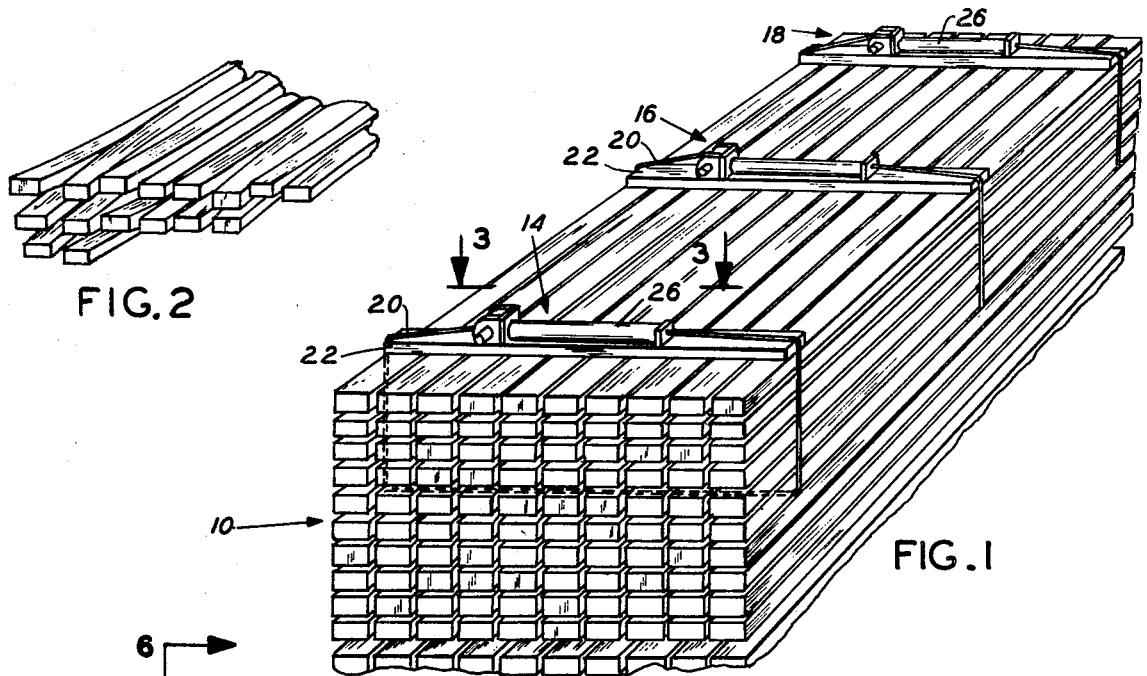
FIG. 2
FIG. 1
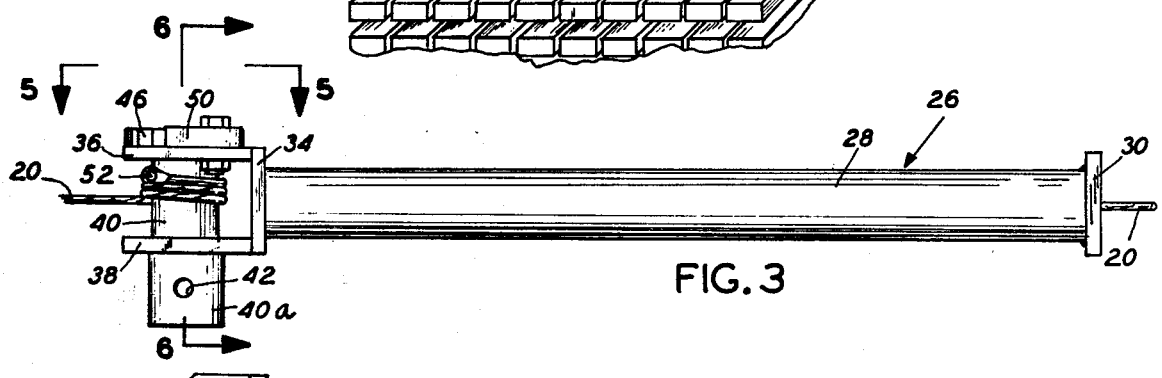
FIG. 3
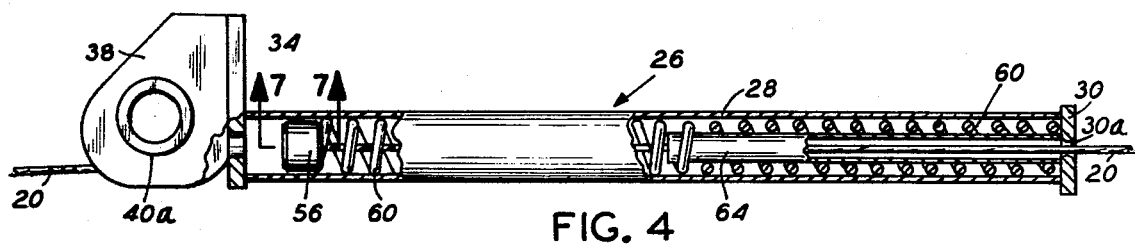
FIG. 4
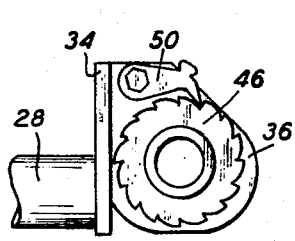
FIG. 5
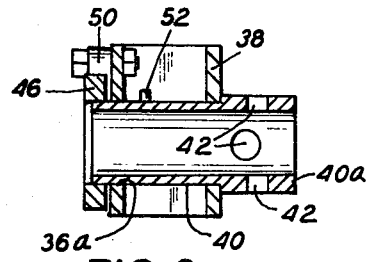
FIG. 6
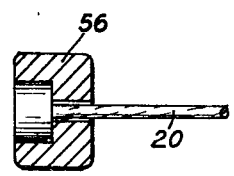
FIG. 7

RESILIENT ARTICLE STACK BINDER

BACKGROUND AND SUMMARY OF THE INVENTION

This invention relates to apparatus for binding a group of articles, and more particularly to such a device which maintains a binding element taut about the load of articles regardless of shifting or changes of configuration of the load.

In binding a load of articles, it is desirable to be able to maintain the binding element taut about the load. One example of the necessity or desirability for such is found in the manufacture of lumber. In the manufacturing process, after the boards are cut to desired size, they are stacked in bundles and carried to a dryer. The bundles preferably are bound to minimize any tendency which the boards may have to warp during the drying process. Explaining further, by binding the load of boards together each will help support the others to prevent warping.

In the past, various binding methods have been used, but these have not been totally satisfactory. During the drying process shrinkage occurs and previously-used stack binding methods have not compensated for this shrinkage. By failing to compensate for the shrinkage the binding on the boards becomes loose and they are then left free to warp.

A general object of the present invention is to provide novel apparatus for binding a group of articles which will maintain a desired binding force in an element extending about the articles.

More specifically, an object of the invention is to provide novel apparatus in which a flexible element extending about the load has its opposite ends interconnected by a device which yieldably biases opposite ends of the element in directions relative to each other to tighten, or maintain a tightened condition, about the articles.

Yet another object of the invention is to provide novel apparatus for binding articles in a stack in which the element extending about the load is maintained taut, although shrinkage or other variations in configuration of the stack of articles may occur.

DRAWINGS

These and other objects and advantages of the present invention will become more fully apparent as the following description is read in conjunction with the drawings wherein:

FIG. 1 is a perspective view of a stack of boards bound together by apparatus constructed according to an embodiment of the invention;

FIG. 2 is a perspective view of an end portion only of a stack of lumber illustrating the effect of warpage which can occur during the drying process in an unbound stack of boards;

FIG. 3 is an enlarged plan view taken generally along the line 3—3 in FIG. 1 of apparatus constructed according to an embodiment of the invention;

FIG. 4 is a side elevation view of the aparatus illustrated in FIG. 3;

FIG. 5 is a detailed illustration of a portion of the apparatus taken generally along the line 5—5 in FIG. 3;

FIG. 6 is a cross sectional view taken generally along the line 6—6 in FIG. 3; and FIG. 7 is an enlarged, cross sectional view taken generally along the line 7—7 in FIG. 4.

DETAILED DESCRIPTION OF AN EMBODIMENT OF THE INVENTION

Referring to the drawings, and first more speficially to FIG. 1, at 10 is indicated a stack, or group, of boards which is either ready for inserting into a dryer, or which has just been removed from a dryer. It will be noted that the boards in the varous courses are spaced apart. This is done by placing sticks between the various courses of boards to provide space through which heated air can circulate to dry the boards in the dryer. It will be noted that in FIG. 1 the boards are substantially straight and aligned with one another in the stack. This is the configuration and orientation of the lumber as it goes into the dryer and is the desired situation as the lumber exits from the dryer. However, without adequate binding of the lumber while it is in the dryer, substantial warpage can occur, as illustrated in FIG. 2.

To inhibit such warpage, apparatus according to the invention herein is used to bind the stack of lumber to hold it in desired position.

Illustrated at 14, 16 and 18 are three devices constructed according to an embodiment of the invention binding the stack of lumber at regions spaced along its length.

Describing one of these devices in detail, and referring to 14 specifically, it includes an elongate flexible element, or cable, 20 which extends about the load of lumber. A board 22 having a length substantially equal to the width of the stack of lumber provides a pressing member to aid in maintaining the tops of the boards in alignment. Board 22 also provides, at its ends, guides about which the cable extends to prevent the cable from digging into the edges of the lumber.

Apparatus interconnecting opposite ends of cable 20 and providing a biasing force thereon to maintain the cable tightened about the stack of lumber is indicated generally at 26.

Referring to FIGS. 3 and 4, device 26 will be described in greater detail. It includes an elongate, cylindrical tube, or spring guide, 28 which has a plate 30 secured, as by welding, over its right end as seen in FIGS. 3 and 4. Plate, or abutment, 30 has a centrally-located bore 30a therein through which cable 20 may extend.

An upright plate 34 is secured to the opposite end of tube 28 and has a pair of laterally-spaced side plates 36, 38 secured thereto which extend outwardly from opposite edges of plate 34. Aligned bores 36a, 38a are formed in plates 36, 38 in which a drum 40 is rotatably mounted.

As is seen in FIG. 6, drum 40 is cylindrical and has a portion 40a which extends outwardly beyond plate 38 as seen in FIGS. 3 and 6. This portion of the drum has a plurality of bores 42 formed therein adapted to receive a turning handle or bar to facilitate turning drum 40, as will be described below.

The opposite end of drum 40 has a ratchet wheel 46 secured thereto and a swingably-mounted pawl 50 is mounted on plate 36 thereabove. The ratchet and pawl permit rotation of the drum in a clockwise direction as illustrated in FIG. 5, but prevent counterclockwise rotation until pawl 50 is raised from engagement with the teeth on ratchet wheel 46.

A post 52 secured to drum 40 (see FIG. 6) is provided for attaching one end of cable 20 to the drum to permit taking up of a portion of the cable on the drum as it is rotated. The tube and take-up device comprise what is referred to herein as connector means to which one end of the cable is attached.

As is seen in FIGS. 4 and 7 the end of cable 20 within tube 28 has a head 56 secured thereto. This is referred to herein as another connector means for the cable. Interposed between head 56 and abutment plate 30 is an elongate compression spring 60. The right end of spring 60 engages abutment plate 30, and the left end of the spring is engaged by head 56, with cable 20 extending longitudinally through the center of the spring.

A second elongate tube 64 having an outer diameter smaller than the inner diameter of spring 60 and an inner diameter greater than the diameter of cable 20 is inserted over cable 20 and extends longitudinally through the center of spring 60. The right end of tube 64 engages abutment plate 30. It provides a limit device which may be engaged by head 56 to limit the extent of deflection of spring 60 during operation, as will be described in greater detail below.

Describing the operation of the device, one end of cable 20 remains connected to device 26 through head 56 being confined within tube 28. The device is placed atop a stack, as illustrated in FIG. 1, and the loose portion of cable 20 is extended about the stack, with its loose end then being connected to post 52 on the take-up drum. The take-up drum is rotated to take up, or wind in, a portion of the cable on drum 40 to reduce the effective length of the cable. As the cable is drawn taut on the load it causes spring 60 to deflect in compression, placing a load on the spring. Cable 20 may be taken up on drum 40 until the spring is compressed sufficiently whereby head 56 engages the left end of tube 64, which in effect limits the deflection of the spring. The ratchet wheel and pawl will retain the drum and the cable attached thereto in the desired tightened relationship until the pawl is released.

With the device thus activated the cable is maintained taut by the yieldable biasing force of the spring urging the ends of the cable in opposite directions relative to each other. Should the stack of articles shrink during drying, or should the load otherwise change configuration, such change in load size or configuration will be accommodated by spring 60 to maintain the cable taut throughout operation.

While a preferred embodiment of the invention has been described herein, it should be apparent to those skilled in the art that variations and modifications are possible without departing from the spirit of the invention.

It is claimed and desired to secure by Letters Patent:

1. Apparatus for binding a group of articles comprising
    an elongate flexible element which may extend about such articles,
    a takeup device for taking up a portion of such flexible element to reduce the effective length of said element,
    an elongate spring,
    an elongate spring guide, one end of which is operatively connected to said takeup device, within which said spring is mounted,
    an abutment, formed at the other end of said guide, which one end of said spring engages,
    a head secured to the other end of said flexible element, which head extends into said guide to engage the end of said spring opposite its abutment-engaging end to compress said spring when urged toward said abutment, and
    limiting means interposed between said head and said abutment operable to limit the deflection of said spring.

2. The apparatus of claim 1 wherein said takeup device comprises a rotatable drum on which a portion of said element may be wound, means for rotating said drum to wind a portion of said element thereon, and means for releasably holding said drum to retain a selected portion of said element thereon.

3. The apparatus of claim 1 wherein said spring is an elongate coil spring, said guide is a tube surrounding said spring, and said flexible element is a cable which extends through the center of said coil spring and outwardly through an end of said tube, and said limit means comprises a second tube shorter than the free length of said spring and extending longitudinally through said spring, with said cable extending through said second tube, said second tube being interposed between said abutment and said head to limit the deflection of said spring.

* * * * *